United States Patent [19]

Wakabayashi et al.

[11] Patent Number: 5,802,407
[45] Date of Patent: Sep. 1, 1998

[54] CAMERA HAVING COMMON CONTROL CIRCUIT USABLE WITH DIFFERENT TYPES OF CAMERAS

[75] Inventors: Hiroshi Wakabayashi, Kanagawa; Hiroshi Terunuma, Chiba, both of Japan

[73] Assignee: Nikon Corporation, Tokyo, Japan

[21] Appl. No.: 250,335

[22] Filed: May 26, 1994

Related U.S. Application Data

[63] Continuation of Ser. No. 912,759, Jul. 13, 1992, abandoned.

[30] Foreign Application Priority Data

Jul. 19, 1991 [JP] Japan ................................ 3-203271

[51] Int. Cl.[6] ............................................. G03B 17/18
[52] U.S. Cl. ................................... 396/287; 396/541
[58] Field of Search ........................ 354/289.1, 289.12, 354/295, 412, 442; 396/439, 281, 286–292, 297, 299, 300, 541

[56] References Cited

U.S. PATENT DOCUMENTS

| | | | |
|---|---|---|---|
| 4,286,849 | 9/1981 | Uchidoi et al. | 354/289.12 X |
| 4,540,262 | 9/1985 | Nakai et al. | 354/289.12 X |
| 4,814,812 | 3/1989 | Nakajima et al. | 354/412 |
| 4,958,181 | 9/1990 | Ishikawa et al. | 354/289.1 |
| 4,994,844 | 2/1991 | Azuma et al. | 354/289.12 |
| 5,016,034 | 5/1991 | Goto | 354/289.12 X |
| 5,113,344 | 5/1992 | Kellogg et al. | 701/35 |

*Primary Examiner*—Eddie C. Lee
*Assistant Examiner*—J. K. Han
*Attorney, Agent, or Firm*—Oliff & Berridge, PLC

[57] ABSTRACT

A camera having a common control circuit comprises a control circuit for selectively executing at least a first program for a first type of camera and a second program for a second type of camera, and an identifying circuit for identifying any one of the two programs to be executed on the basis of an input identifying signal. The identified one of the programs is executed by the control circuit, and the identifying signal is output when electrical parts inherent to the first and second types of cameras are installed to the camera respectively.

24 Claims, 8 Drawing Sheets

MODE

CAMERA HAVING COMMON CONTROL CIRCUIT USABLE WITH DIFFERENT TYPES OF CAMERAS

This is a Continuation of application Ser. No. 07/912,759 filed Jul. 13, 1992, now abandoned.

BACKGROUND OF THE INVENTION

1. FIELD OF THE INVENTION

This invention relates to a camera having a control circuit which is commonly used for at least a first type of camera and for a second type of camera having different specifications, for selectively executing at least a first program for the first type of camera and a second program for the second type of camera, and more particularly to a camera having an improved signal generating portion for identifying each of the first and second types of cameras.

2. Related Background Art

There has been conventionally utilized a camera having a single control circuit (comprising a CPU, etc.) which is beforehand stored with various programs for plural types of cameras having different specifications. In this camera, a part of the predetermined electrical device of the camera is short-circuited by soldering or wiring, and the short-circuit state is determined to execute a desired one of the programs.

However, in this type of camera, a work for a step of short-circuiting as described above is required, and thus the number of fabricating steps or processes for the camera is increased. The increase in the number of fabricating processes frequently induces malfunction due to a manufacturing error. For example, there would occur a case where a photographic information displayed on a display panel is inconsistent with the actual operation of the camera, or a case where the state of an operating switch is inconsistent with the actual operation of the camera.

SUMMARY OF THE INVENTION

An object of the present invention is to provide a camera having a control circuit which is commonly used for various types of cameras having different specifications and adapted to execute any one of a plurality of programs for these cameras in accordance with an identifying signal generated by merely installing in the camera an electrical part inherent to each of these types of cameras.

In order to achieve the above object, a camera according to one aspect of this invention comprises control means for selectively executing at least a first program for a first type of camera and a second type of program for a second camera, identifying means for identifying one of the first and second programs to be executed in response to an input identifying signal, the identified program being executed by the control means, and identifying signal outputting means for outputting the identifying signal when electrical parts inherent to the first and second types of cameras, such as a liquid crystal display element, a mode switch, or the like, are installed to the camera.

According to the camera of this invention, the identifying signal outputting means is constructed so that a first identifying signal is output when an electrical part for the first type of camera is installed to a portion of the camera, where the electrical parts inherent to the first and second types of cameras, such as the liquid crystal display element, the mode switch or the like are mounted respectively, and a second identifying signal is output when an electrical part for the second type of camera is mounted to that portion of the camera.

When each of the electrical parts inherent to the respective cameras having different specifications is installed to the camera according to this invention, each electrical part serves to make individual electrical connection through which an identifying signal representing the first or second type of camera is output. Therefore, it is not required to carry out a short-circuiting process and other processes which have been indispensable to the conventional camera. As a result, the number of fabricating processes can be decreased, and the malfunction of the camera due to the manufacturing error can be prevented.

An electrical equipment according to another aspect of this invention comprises control means for selectively executing at least a first program for a first type of electrical equipment and a second program for a second type of electrical equipment, identifying means for identifying one of the first and second programs to be executed in response to an input identifying signal, the identified program being executed by the control means, and identifying signal outputting means for outputting the identifying signal when electrical parts inherent to the first and second types of electrical equipment are installed to the electrical equipment respectively.

DETAILED DESCRIPTION OF THE PREFERRED EMBODIMENTS

First Embodiment

A first embodiment of a camera according to this invention in which an identifying signal is generated using a terminal of a LCD panel will be first described with reference to FIGS. 1 to 4.

Figure 1A:
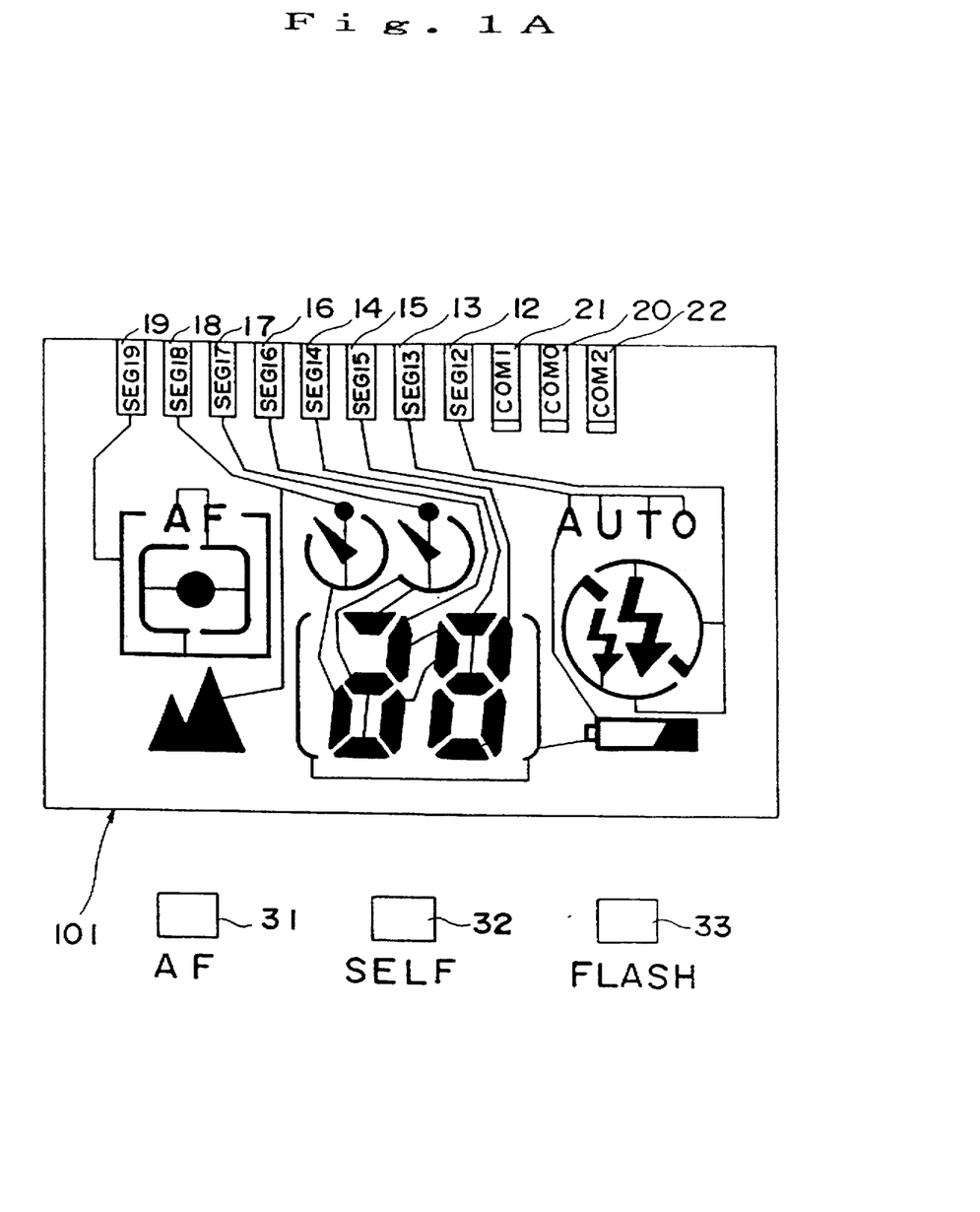
FIGS. 1A and 1B show liquid crystal display (LCD) panels for a first type of camera of the first embodiment according to the present invention.
Figure 1B:
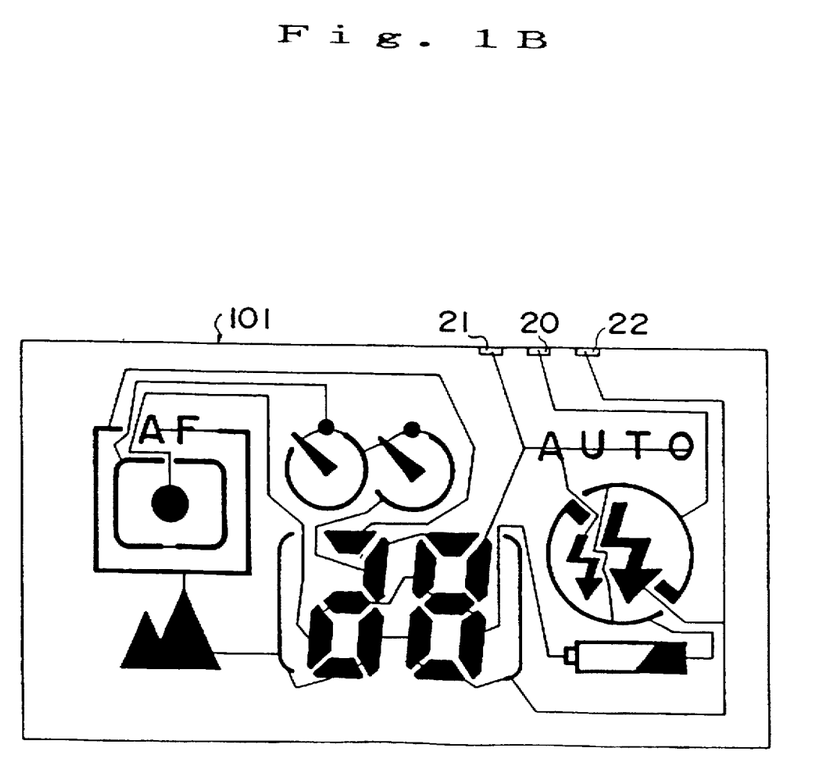

FIGS. 1A and 1B show segment-connection patterns for a LCD panel 101 which is inherently used for a first type of camera. The first camera adopts a ⅓ duty driving mode for the LCD panel 101, and thus each of segment terminals 12 to 19 is connected to three segments as shown in FIG. 1A and each of common terminals 20 to 22 is also connected to three segments as shown in FIG. 1B. As is well known, the terminals of segments to be displayed are supplied with a driving voltage in time-sharing mode to perform a display operation of the segments of the LCD panel 101 as shown in FIGS. 1A and 1B.

In FIG. 1A, reference numerals 31 to 33 represent operating buttons. The operating button 31 serves to select one of automatic focusing modes for an automatic focus adjusting device. Each of a spot autofocus mode, an infinity focus mode and a multi-point autofocus mode is selected by turns each time the operating button 31 is pushed. The operating button 32 serves as a self-timer mode selecting button, and each of a single-shot self-timer mode, a two-shot self-timer mode and a self-timer-cancel mode is alternately selected each time the operating button 32 is pushed. The operating button 33 serves to select one of flash photographing mode, and each of an auto flash with red-eye reduction mode, an anytime flash mode and a flash-cancel mode is alternately selected each time the operating button 33 is pushed.

The detailed description of the modes selected by the respective operating buttons is omitted because they have been well known and do not directly pertain to the subject matter of this invention.

Figure 2:
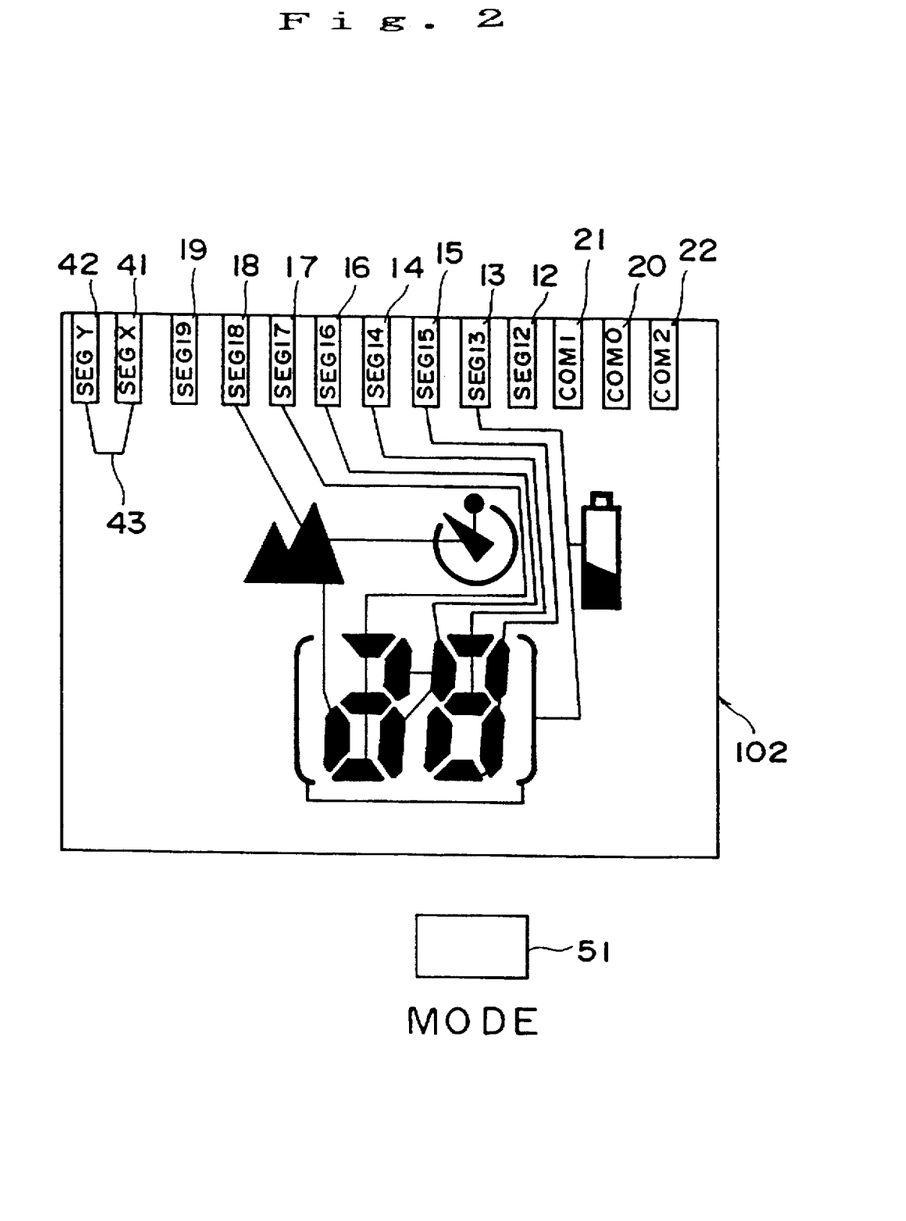
FIG. 2 shows a LCD panel for a second type of between camera of the first embodiment according to the present invention.

FIG. 2 shows a segment connection pattern of a LCD panel 102 for a second type of camera. As shown in FIG. 2, the second camera has a more simplified setting mode for an automatic focus adjusting operation, a self-timer operation, and a flash photographic operation in comparison with the first camera. For example, the multiple autofocus mode, the two-shot self-timer mode and various modes for the flash photographing operation are omitted. A reference numeral 51 represents an operating button, and the self-timer mode, the infinity focus mode and the normal mode are alternately selected each time operation of the operating button 51 is pushed.

In FIG. 2, the LCD panel 102 is provided with terminals 41 and 42 to generate an identifying signal, and these terminals 41 and 42 are beforehand short-circuited through a transparent electrode 43. Like the LCD panel 101 as shown in FIG. 1, the LCD panel 102 as shown in FIG. 2 is driven in the ⅓ duty driving mode, and thus each of segment terminals 13 to 18 is connected to three segments. The segment terminals 12 and 19 are not used in the LCD panel 102.

Figure 3:
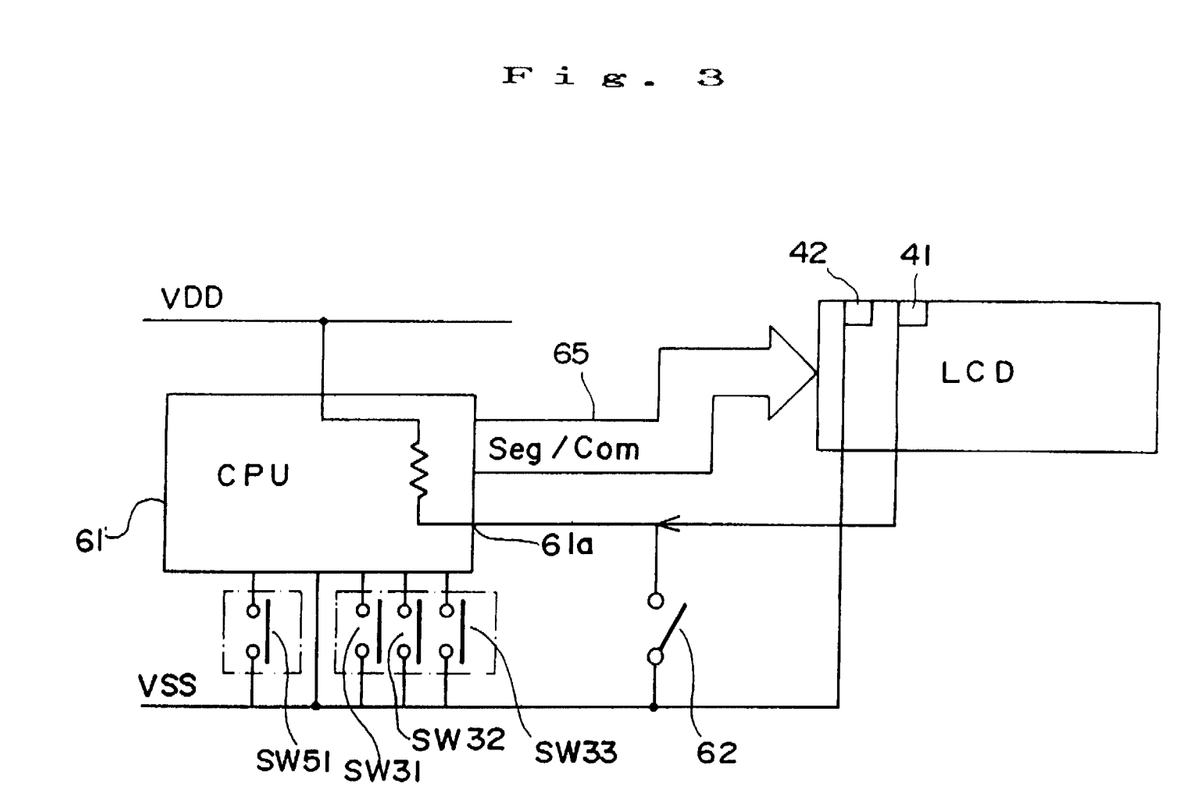
FIG. 3 is a schematic diagram showing an embodiment of a control circuit of the present invention.

FIG. 3 is a schematic diagram which shows a control circuit of a camera to which this invention is applied.

A reference numeral 61 represents a control circuit including a CPU (Central Processing Unit) for selecting any one of programs for the first and second types of cameras so as to execute a selected one of the program. When the LCD panel 101 for the first type of camera or the LCD panel 102 for the second type of camera is installed to a camera, respective LCD driving ports of the control circuit 61 are connected to the segment terminals 12 to 19 and the common terminals 20 to 22 of the LCD panel 101 or 102 through a circuit 65.

In this first embodiment, the control circuit 61 is provided with an identifying port 61a. When the LCD panel 101 for the first type of camera is installed in the camera, the identifying port 61a is kept in a non-connection or open state because the LCD panel 101 has no identifying terminal which corresponds to the identifying port 61a, and thus the identifying port 61a is kept in a high-level. On the other hand, when the LCD panel 102 for the second type of camera is installed in the camera, the identifying port 61a is connected to the identifying terminal 41 which is provided inherently to LCD panel 102. Since an installation of the LCD panel 102 for the second type of camera to the camera causes the identifying terminal 42, which is short-circuited to the identifying terminal 41 of the LCD panel 102, to be connected to a ground voltage VSS, the identifying port 61a is kept in a low-level when the LCD panel 102 for the second types of camera is installed to the camera.

For the types of first camera, the control circuit 61 is connected to switches SW31 to 33 operated by the operating buttons 31 to 33, while for the second camera, the control circuit 61 is connected to a switch SW51 operated by the operating button 51.

In FIG. 3, before the LCD panel is installed to the camera, a switch 62 connected between a source voltage line and a ground voltage line can be on-off operated for a selection of any one of the programs stored in the control circuit 61.

Figure 4:
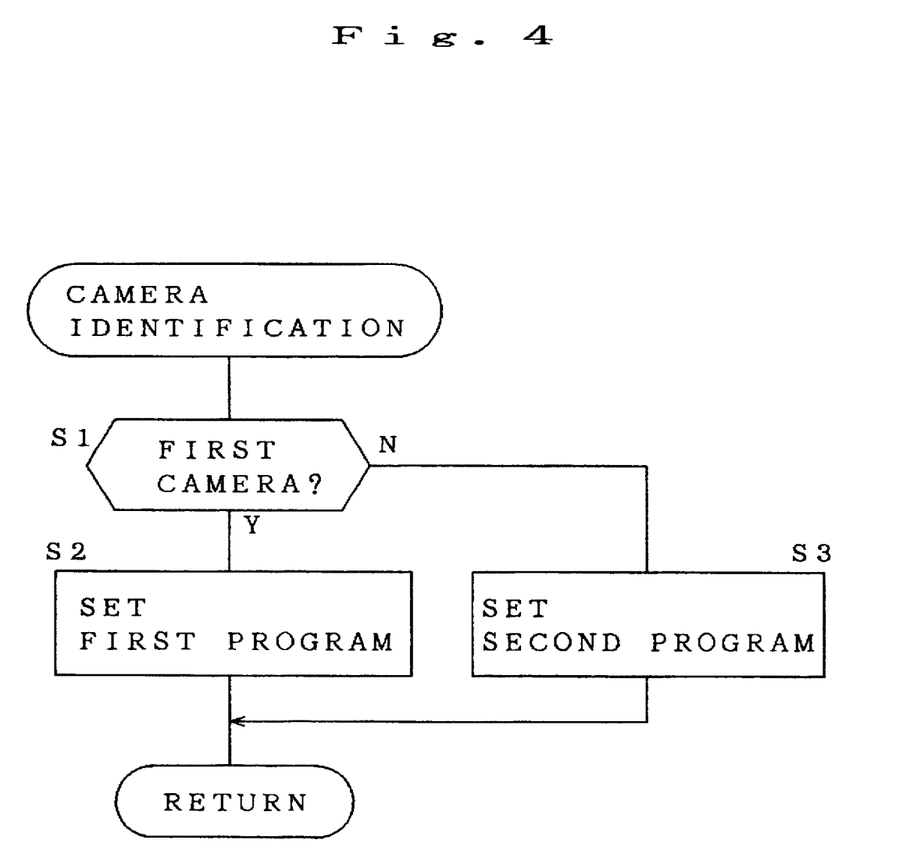
FIG. 4 is a flowchart for a process of discriminating each of the first and second types of cameras and setting a program therefor.

An operation of the camera according to this invention will be described in more detail with reference to FIG. 4 showing a flowchart of a subroutine for a camera identifying process. At a step S1, an input signal of the identifying port 61a is read out to identify each of the first and second types of cameras. The installation of the LCD panel 101 for the first type of camera shown in FIG. 1 to the camera results in the high level signal of the identifying port 61a, while the installation of the LCD panel 102 for the second type of camera as shown in FIG. 2 to the camera results in the low level signal of the identifying port 61a. Accordingly, the control circuit 61 can identify each of the first and second types of cameras in accordance with the signal of the identifying port 61a.

If the first type of camera is identified at the step S1, the program goes to a step S2 to set the head address of the first program for the first type of camera to an address-pointer of the CPU so that the first program is allowed to be executed. If the first type of camera is not identified at the step S1, the program goes to a step S3 to set the head address of the second program for the second type of camera to the address-pointer so that the second program is allowed to be executed.

In a main program (not shown), the first or second program is executed in accordance with the head address which has been set at the step S2 or S3.

Figure 5:
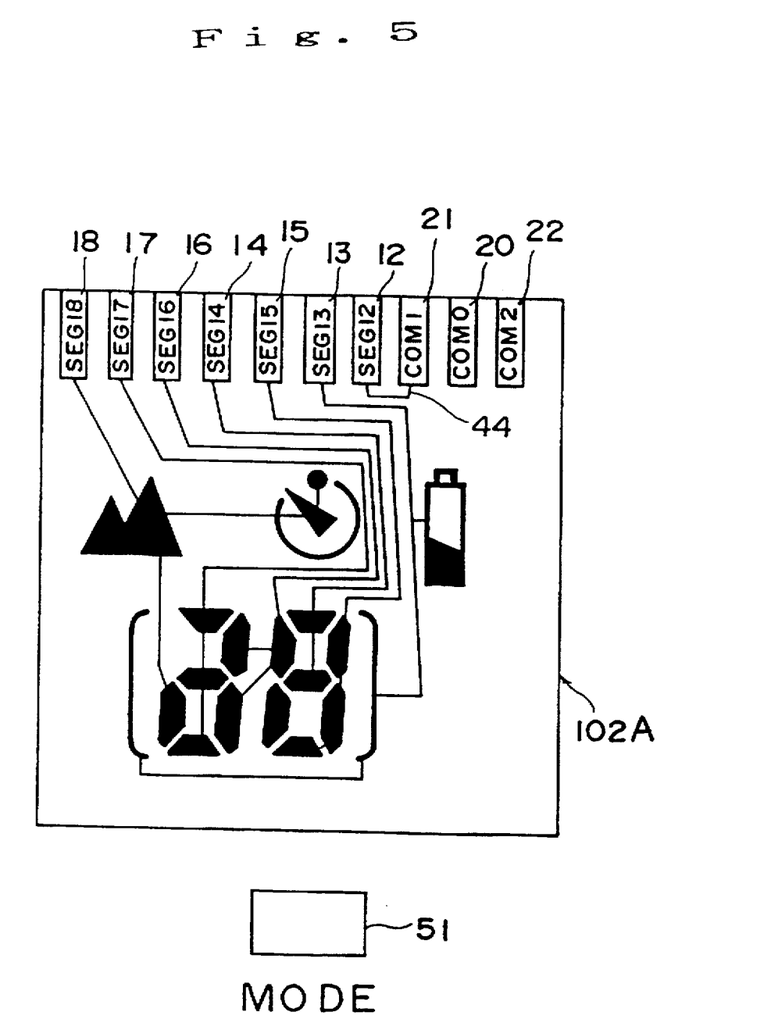
FIG. 5 shows a modification of the LCD panel for the second type of camera.

In the embodiment as shown in FIG. 2, the LCD panel 102 is particularly provided with the identifying terminals 41 and 42. However, an LCD panel 102A as shown in FIG. 5 may be used. Since the segment terminal 12 and the common terminal 21 of the LCD panel 102A are not required for the display operation of the second type of camera, the terminals 12 and 21 are short-circuited to each other through a transparent electrode 44 so that an identifying operation can be carried out by the control circuit 61. In this case, the identifying operation is carried out without using the identifying port 61a by merely reading out the voltage level of A port, which is one of the LCD driving ports of the control circuit 61 and is connected to the segment terminal 12 of the LCD panel 101 or 102 through the circuit 65.

Since the LCD panel 101 as shown in FIGS. 1A and 1B is used for the first type of camera, by supplying a LCD driving voltage to the segment terminal 12 through the port of the LCD driving ports, the LCD driving voltage appears at this port. On the other hand, since the LCD panel 102 as shown in FIG. 5 is used for the second type of camera, a common voltage appears the same port connected to the segment terminal 12. That is, each of the first and second types of cameras can be identified on the basis of the voltage level at the above-described port of the control circuit 61 which is connected to the segment terminal 12.

Figure 6:
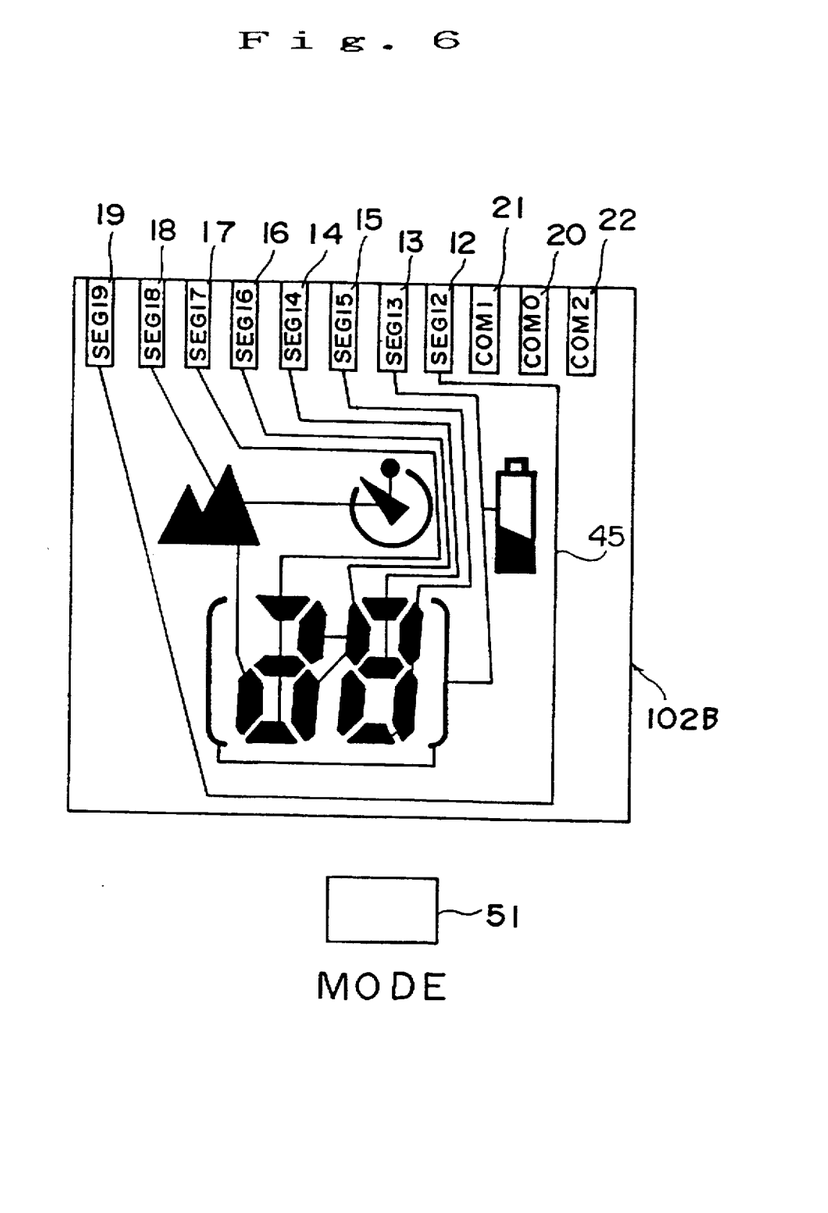
FIG. 6 shows another modification of the LCD panel for the second type of camera.

Further, as shown in FIG. 6, the segment terminals 19 and 12 of the LCD panel 102B which are not required for the display operation of the second type of camera may be short-circuited by a transparent electrode 45. In this case, each of the first and second types of cameras can be identified in accordance with the voltage level of respective ports of the control circuit 61 which are connected to the segment terminals 19 and 12 respectively. That is, in a case where the segment terminals 19 and 12 are short-circuited to each other through the transparent electrode 45, when a predetermined voltage is supplied to any one of the ports of the control circuit 61 which are connected to the segment terminals 19 and 12 respectively, a signal having the substantially same potential appears at the other port. On the basis of the appearance of this signal, the installation of the LCD panel 102B for the second type of camera can be discriminated. On the other hand, in a case where the LCD panel 101 for the first type of camera is installed, even when a predetermined voltage is supplied to any one of the ports of the control circuit 61 which are connected to the segment terminals 19 and 12 respectively, the signal does not appear at the other port. Therefore, the installation of the LCD panel 101 for the first type of camera can be discriminated on the basis of the voltages of the above-described ports of the LCD driving ports.

According to the present embodiment, the identifying signal can be generated without making the LCD panel 102 of the second camera larger in size, the function of which is fewer than the first type of camera, because the segment terminals and common terminals as shown in FIGS. 5 and 6 necessarily provided to the LCD panel can be used so as to generate the identifying signal.

Second Embodiment

Figure 7:
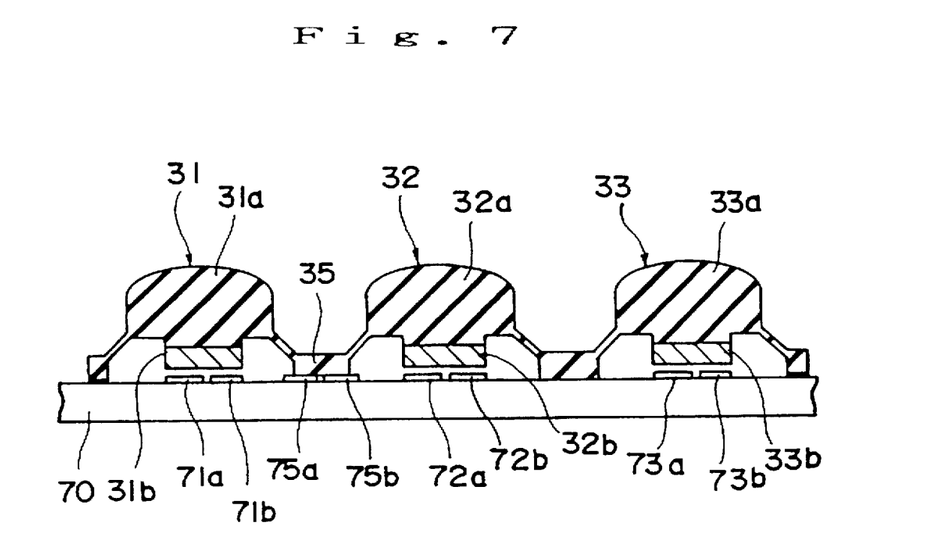
FIG. 7 is a vertical plane of an operating button for the first type of camera according to another embodiment.
Figure 8:
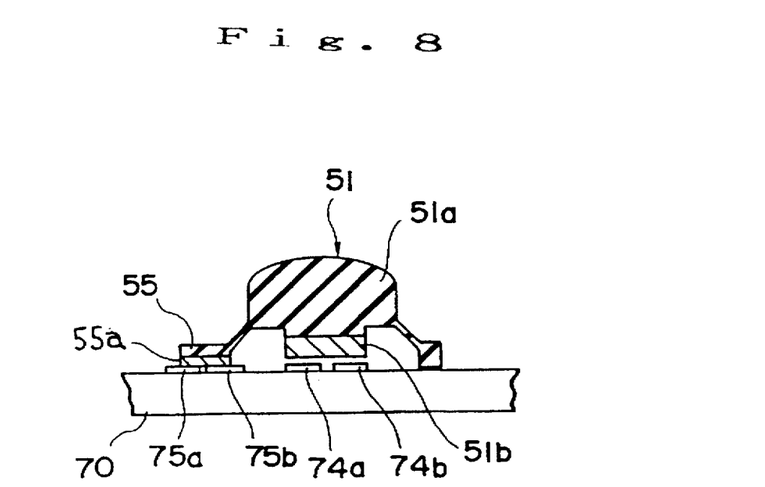
FIG. 8 is a vertical plane of an operating button for the second type of camera according to another embodiment.

FIGS. 7 and 8 show an embodiment of the camera in which the identifying signal as described above is generated when each of the operating buttons 31 to 33 and the operating button 51 is installed to the corresponding camera.

FIG. 7 is a vertical plane of the operating buttons 31 to 33 for the first type of camera. The operating buttons 31 to 33 are mounted onto a circuit board 70 by a plate (not shown). First, second and third conductive members 31b to 33b are provided on the bottom surfaces of three operating portions 31a to 33a each formed of insulating material respectively. First conductive patterns 71a and 71b, second conductive patterns 72a and 72b, and third conductive patterns 73a and 73b are provided on surface portions of the circuit board 70 which confront the conductive members 31b to 33b respectively. The operating and non-operating states of each of the buttons 31 to 33 are detected through the contact and non-contact between each conductive member and each conductive pattern.

FIG. 8 is a vertical plane of the operating button 51 for the second type of camera as described above. The operating button 51 is mounted onto the circuit board 70 by the plate (not shown). A conductive member 51b is provided on the bottom surface of an operating portion 51a formed of insulating material. Conductive patterns 74a and 74b are provided onto a surface portion of the circuit board 70 which confronts the conductive member 51b. The operating and non-operating states of the operating button 51 are detected through the contact and non-contact between the conductive member and the conductive patterns.

As shown in FIGS. 7 and 8, identifying conductive patterns 75a and 75b are provided on each of the circuit boards 70 for the first and second types of cameras. In the first type of camera, even if the operating bottoms 31 to 33 are installed to the circuit board 70, the identifying conductive patterns 75a and 75b are insulated by an insulating leg portion 35 to each other as shown in FIG. 7. On the other hand, in the second type of camera, a conductive member 55a is provided onto the bottom surface of the insulating leg portion 55 as shown in FIG. 8, and the identifying conductive patterns 75a and 75b are conducted when the operating button 51 is installed to the circuit board 70. Accordingly, if the identifying conductive pattern 75a is connected to the identifying port 61a of the control circuit 61 and the other identifying conductive pattern 75b is connected to the ground voltage VSS, through these connections the control circuit 61 can identify each of the first and second types of cameras by merely reading out the signal level of the identifying port 61a thereof.

In the above embodiments, the identifying signal is generated using the LCD panel or the mode selection switch. However, the identifying signal may be generated by installing of electrical parts other than the above elements.

Further, in the above embodiments, the identifying signal having a high or a low level is generated by the two identifying terminals which are provided on the LCD panel or the identifying switch which is provided on a mount portion of the mode selection switch, and any one of the two programs is selected in accordance with the identifying signal. In place of the above manner, three or more identifying terminals or two or more identifying switches may be provided to generate three or more kinds of identifying codes and then select any one of three or more programs in accordance with these identifying codes.

This invention is applicable not only to a camera, but also to various types of electrical equipment having a common control circuit.

What is claimed is:

1. A camera, said camera being one of a first type of camera and a second type of camera, said camera incapable of being both said first type of camera and said second type of camera, said camera having a first set of specifications and being capable of performing a first set of operations when said camera is said first type of camera, said camera having a second set of specifications different from said first set of specifications and being capable of performing a second set of operations different from said first set of operations when said camera is said second type of camera, said camera comprising:

a common control circuit, said common control circuit including: at least a first program and a second program, said first program for controlling said first set of operations when said camera is said first type of camera, said second program for controlling said second set of operations when said camera is said second type of camera;

said camera having only one of said first set of specifications and said second set of specifications so that said camera is capable of performing only the corresponding one of the first and second sets of operations; and a control circuit that includes:

a first control portion that selectively executes at least the first program but not the second program when said camera is the first type of camera and at least the second program but not the first program when said camera is the second type of camera;

a second control portion that identifies one of the first and second programs to be executed in response to an input identifying signal, said first control portion executing the identified one of the first and second programs; and a third control portion that outputs the identifying signal when an electrical part inherent to each of the first and second types of cameras and being other than an accessory readily interchangeable by a photographer during use of the camera, is initially installed to said camera in a fabrication process, the identifying signal representative of the type of the camera and the set of operations of the camera.

2. The camera as claimed in claim 1, wherein said inherent electrical part includes a liquid crystal display element inherent to each of said first and second types of cameras, said second control portion including an identifying port that receives said identifying signal, said identifying port being electrically engageable with said liquid crystal display element, said second control portion identifying the first program for execution when said liquid crystal display element includes an identifying terminal, and said second control portion identifying the second program for execution when said liquid crystal display element includes no identifying terminal.

3. The camera as claimed in claim 2, wherein said camera includes a mount portion onto which said liquid crystal display element is mounted, said mount portion including a first terminal connected to a ground line and a second terminal connected to said identifying sort of said second control portion, said first and second terminals respectively engageable with first and second identifying terminals on said liquid crystal display element, said second control portion identifying said first control program when the first and second identifying terminals are short-circuited to each other on said liquid crystal display element.

4. The camera as claimed in claim 1, wherein said electrical part comprises a mode switch for selecting any one of various kinds of photographing modes, said camera including a mount portion onto which said mode switch is mounted, an identifying switch being provided on said mount portion, said second control portion including an identifying port connected to said identifying switch so as to receive said input identifying signal, an on/off state of said identifying switch being defined when said mode switch is mounted onto the mount portion.

5. The camera as claimed in claim 4, wherein said second control portion identifies said first program when said identifying switch is placed in a conducting state by a conductive member located on a mount leg of said mode switch, and said second control portion identifies said second program when said identifying switch is placed in a non-conducting state by an insulating member located on the mount leg of said mode switch.

6. The camera as claimed in claim 1, wherein said first set of specifications contains more specifications than said second set of specifications, and said camera is capable of performing more operations when said camera is said first type of camera than when said camera is said second type of camera.

7. The camera as claimed in claim 1, wherein said electrical part inherent to each of the first and second types of cameras is one of a first display device usable with said camera when said camera is the first type of camera and a second display device usable with said camera when said camera is the second type of camera, said first program capable of operating said first display device to display a first pattern, said second program capable of operating said second display device to display a second pattern different from said first pattern.

8. The camera as claimed in claim 7, wherein said first pattern includes an autofocus pattern, a dual timer pattern, and an autoflash pattern, and said second pattern includes a single timer pattern and does not include an autofocus pattern and an autoflash pattern.

9. The camera as claimed in claim 1, wherein said electrical part inherent to each of the first and second types of cameras is one of a first mode selection assembly usable with said camera when said camera is the first type of camera and a second mode selection assembly usable with said camera when said camera is the second type of camera, said first program capable of operating said first mode selection assembly to control said camera to perform said first set of operations when said camera is said first type of camera, said second program capable of operating said second mode selection assembly to control said camera to perform said second set of operations when said camera is said second type of camera.

10. The camera as claimed in claim 9, wherein said first mode selection assembly includes a plurality of selection switches, and said second mode selection assembly includes a single switch.

11. A camera, said camera being one of a first type of camera and a second type of camera, said camera incapable of being both said first type of camera and said second type of camera, said camera having a first set of specifications and being capable of performing a first set of operations when said camera is said first type of camera, said camera having a second set of specifications different from said first set of specifications and being capable of performing a second set of operations different from said first set of operations when said camera is said second type of camera, said camera comprising:

a common control circuit, said common control circuit including: at least a first program and a second program, said first program for controlling said first set of operations when said camera is said first type of camera, said second program for controlling said second set of operations when said camera is said second type of camera;

said camera having only one of said first set of specifications and said second set of specifications so that said camera is capable of performing only the corresponding one of the first and second sets of operations; and a control circuit that includes:

a first control portion that selectively executes at least the first program but not the second program when said camera is the first type of camera and at least the second program but not the first program when said camera is the second type of camera;

a second control portion that identifies one of the first and second programs to be executed in response to an input identifying signal, said first control portion executing the identified one of the first and second programs; and an identifying signal outputting device in the camera for outputting a first identifying signal when a part inherent to said first type of camera and being other than an accessory readily interchangeable by a photographer during use of the camera, is initially installed to said camera in a fabrication process, and outputting a second identifying signal when a part inherent to said second type of camera and being other than an accessory readily interchangeable by a photographer during use of the camera, is initially installed to said camera in the fabrication process, so that said second control portion identifies said first program when said first identifying signal is output, and identifies said second program when said second identifying signal is output, the identifying signal representative of the type of the camera and the set of operations of the camera.

12. The camera as claimed in claim 11, wherein said inherent part includes a liquid crystal display panel inherent to each of said first and second types of cameras, said identifying signal outputting device being electrically engageable with said liquid crystal display panel, said identifying signal outputting device outputting said first identifying signal when said liquid crystal display panel includes an identifying terminal, and said second identifying signal outputting device outputting said second identifying signal when said liquid crystal display panel includes no identifying terminal, said first and second identifying signals having different signal levels in accordance with presence of said identifying terminal.

13. The camera as claimed in claim 12, wherein said camera includes a mount portion onto which said liquid crystal display panel is mounted, said mount portion including a first terminal connected to a ground line and a second terminal connected to said identifying signal outputting device, said first and second terminals respectively engageable with first and second identifying terminals on said liquid crystal display panel, said identifying signal outputting device outputting said first identifying signal when the first and second identifying terminals are short-circuited to each other on said liquid crystal display panel.

14. The camera as claimed in claim 11, wherein said part comprises a mode switch for selecting any one of various kinds of photographing modes, and wherein said identifying signal outputting device includes an identifying switch which is connected to an identifying port of said second control portion and provided to a mount portion of said camera onto which said mode switch is mounted, an on/off state of said identifying switch being defined when said mode switch is mounted onto the mount portion.

15. The camera as claimed in claim 14, wherein said identifying signal outputting device outputs said first identifying signal when said identifying switch is placed in a conducting state by a conductive member located on a mount leg of said mode switch, and said identifying signal outputting device outputs said second identifying signal when said identifying switch is placed in a non-conducting state by an insulating member located on the mount leg of said mode switch.

16. The camera as claimed in claim 11, wherein said identifying signal outputting device is provided to a mount portion for said part inherent to said first and second types of cameras, and connected to an identifying port of said second control circuit.

17. The camera as claimed in claim 11, wherein said part inherent to said first and second types of cameras is an electrical part.

18. A method of programming a camera, said camera being one of a first type of camera and a second type of camera, said camera incapable of being both said first type of camera and said second type of camera, said camera having a first set of specifications and being capable of performing a first set of operations when said camera is said first type of camera, said camera having a second set of specifications different from said first set of specifications and being capable of performing a second set of operations different from said first set of operations when said camera is said second type of camera, said camera having a common control circuit, said common control circuit including at least a first program and a second program, said first program for controlling said first set of operations when said camera is said first type of camera, said second program for controlling said second set of operations when said camera is said second type of camera, said camera having only one of said first and second sets of specifications so that said camera is capable of performing only the corresponding one of the first and second sets of operations, said method comprising:

initially installing in said camera one of: a first part inherent to said first type of camera and being other than an accessory readily interchangeable by a photographer during use of the camera, in a fabrication process, and a second part inherent to said second type of camera and being other than an accessory readily interchangeable by a photographer during use of the camera, in the fabrication process;

identifying which of the first and second parts has been installed in said camera using an identifying signal representative of the type of camera and the set of operations of the camera; and executing the first program but not the second program when the first part is identified by the identifying signal and executing the second program but not the first program when the second part is identified by the identifying signal so that said first program is executed when said camera is said first type of camera and said second program is executed when said camera is said second type of camera.

19. The method as claimed in claim 18, wherein said first set of specifications contains more specifications than said second set of specifications, and said camera is capable of performing more operations when said camera is said first type of camera than when said camera is said second type of camera.

20. The method as claimed in claim 18, wherein said first part is a first display device usable with said camera when said camera is the first type of camera and the second part is a second display device usable with said camera when said camera is the second type of camera, said first program capable of operating said first display device to display a first pattern, said second program capable of operating said second display device to display a second pattern different from said first pattern.

21. The method as claimed in claim 20, wherein said first pattern includes an autofocus pattern, a dual timer pattern, and an autoflash pattern, and said second pattern includes a single timer pattern and does not include an autofocus pattern and an autoflash pattern.

22. The method as claimed in claim 18, wherein said first part is a first mode selection assembly usable with said camera when said camera is the first type of camera and the second part is a second mode selection assembly usable with said camera when said camera is the second type of camera, said first program capable of operating said first mode selection assembly to control said camera to perform said first set of operations when said camera is said first type of camera, said second program capable of operating said second mode selection assembly to control said camera to perform said second set of operations when said camera is said second type of camera.

23. The method as claimed in claim 22, wherein said first mode selection assembly includes a plurality of selection switches, and said second mode selection assembly includes a single switch.

24. The method as claimed in claim 18, wherein said first and second parts are electrical parts.

* * * * *